United States Patent [19]
Sharp et al.

[11] Patent Number: 5,469,279
[45] Date of Patent: Nov. 21, 1995

[54] CHIRAL SMECTIC LIQUID CRYSTAL MULTIPASS OPTICAL FILTERS INCLUDING A VARIABLE RETARDER (AND A VARIABLE ISOTROPIC SPACER)

[75] Inventors: D. Gary Sharp; M. Kristina Johnson, both of Boulder, Colo.

[73] Assignee: The University of Colorado Foundation, Inc., Boulder, Colo.

[21] Appl. No.: 967,218

[22] Filed: Oct. 27, 1992

Related U.S. Application Data

[63] Continuation-in-part of Ser. No. 792,284, Nov. 14, 1991, Pat. No. 5,381,253, and Ser. No. 884,644, May 15, 1992, Pat. No. 5,243,455, which is a continuation-in-part of Ser. No. 522,215, May 11, 1990, Pat. No. 5,132,826, which is a continuation-in-part of Ser. No. 429,304, Oct. 30, 1989, abandoned.

[51] Int. Cl.$^6$ .................. G02F 1/133; G02F 1/1335; G02F 1/13
[52] U.S. Cl. .................. 359/53; 359/73; 359/100; 359/260
[58] Field of Search .................. 359/53, 70, 71, 359/73, 100, 494, 497, 498, 260

[56] References Cited

U.S. PATENT DOCUMENTS

| | | | |
|---|---|---|---|
| 4,232,948 | 11/1980 | Shanks | 359/53 |
| 4,367,924 | 1/1983 | Clark et al. | 359/100 |
| 4,394,069 | 7/1983 | Kaye | 359/53 |
| 4,563,059 | 1/1986 | Clark et al. | 359/100 |
| 4,772,104 | 9/1988 | Buhrer | 359/497 |
| 4,779,959 | 10/1988 | Saunders | 359/84 |
| 4,790,634 | 12/1988 | Miller et al. | 356/352 |
| 5,068,749 | 11/1991 | Patel | 359/93 |
| 5,132,826 | 7/1992 | Johnson et al. | 359/93 |
| 5,321,539 | 6/1994 | Hirabayashi et al. | 359/70 |

FOREIGN PATENT DOCUMENTS

| | | |
|---|---|---|
| 2238200 | 2/1975 | France. |
| 9009614 | 8/1990 | WIPO. |

OTHER PUBLICATIONS

Funfschilling et al., "Fast Responding... Displays", J. Appl. Phys. 66(8), 15 Oct. 1989, pp. 3877–3882.
Sharp et al., "Continuously tunable smectic A* liquid-crystal color filter", Optics Letters, vol. 15, No. 10, 15 May 1990, pp. 523–525.
Andersson et al., "Device... Effect", J. Appl. Phys. vol. 66, No. 10, Nov. 15, 1989, pp. 4983–4995.
Masterson et al., "Ferroelectric... Tunable Filter", Optics Letters, vol. 14, No. 22, Nov. 15, 1989, pp. 1249–1251.
Sharp et al., "Smectic... Tunable Filters", Ferroelectrics vol. 114, 1991, pp. 55–69.
Katzenstein, "New Type of Birefringent filter", J. Opt. Soc. America, vol. 58, No. 10, Oct. 1968, pp. 1348–1355.
Williamson, "Simple Multiple-Pass, Birefringent Filter", vol. 61, No. 6, Jun. 1971, pp. 767–769.
Weis et al., "Electromagnetic... Structures", J. Opt. Soc. America, vol. 4, No. 9, Sep. 1987, pp. 1720–1740.

(List continued on next page.)

*Primary Examiner*—William L. Sikes
*Assistant Examiner*—Ron Trice
*Attorney, Agent, or Firm*—Greenlee and Winner

[57] ABSTRACT

This invention provides a multipass Šolc filter which utilizes liquid crystal variable retarders to provide high resolution and tunability. The Šolc polarization-interference effects are used synergistically with the Fabry-Perot cavity resonances. The cavity comprises a central retarder, two quarter wave plates, and an optional isotropic spacer. The central retarder or the isotropic spacer can include liquid crystal cells to provide tuning of the Šolc envelope or the cavity resonances respectively. In one embodiment the variable retarder is a three element quarter-half-quarter device with a liquid crystal electro-optically rotatable half-wave plate. Reflection mode configurations are introduced wherein, because of the bilateral symmetry of the Šolc filter, it is possible to use only half of the intracavity elements. Criteria for designing filter parameters to meet resolution, out-of-band discrimination, and tuning range requirements are provided.

23 Claims, 9 Drawing Sheets

OTHER PUBLICATIONS

Maeda et al., "Electronically . . . Systems", IEEE Photonics Tech. let., vol. 2, No. 11, Nov. 1990, pp. 820–822.

Biernacki et al., "Polarization . . . Modulation", Proceedings of SPIE Conference: Liquid Crystal Devices and Materials, San Jose, Calif., Feb. 25–27, 1991, pp. 167–178.

Title et al., "Tunable Birefrigent Filters", Optical Engineering vol. 20, No. 6, Dec. 1981, pp. 815–823.

Hirabayashi et al., "New . . . Systems", IEEE Photonics Tech. Let, vol. 3, No. 8, Aug. 1991, pp. 741–743.

Beckers, "Achromatic linear Retarders", Applied Optics, vol. 10, No. 4, Apr. 1971, pp. 973–975.

Wilson et al., *Optoelectronics: An Introduction*, 1983, p. 104.

CHIRAL SMECTIC LIQUID CRYSTAL MULTIPASS OPTICAL FILTERS INCLUDING A VARIABLE RETARDER (AND A VARIABLE ISOTROPIC SPACER)

This application is a continuation-in-part of U.S. patent applications 07/792,284, filed Nov. 14, 1991, now U.S. Pat. No. 5,381,253 which is incorporated by reference in its entirety herein, and U.S. Pat. No. 07/884,664, filed May 15, 1992, now U.S. Pat. No. 5,243,455, which is a continuation-in-part of 07/522,215, filed May 11, 1990, now U.S. Pat. No. 5,132,826, which is incorporated by reference in its entirety herein, which is a continuation-in-part of U.S. Pat. No. 07/429,304, filed Oct. 30, 1989, now abandoned.

FIELD OF THE INVENTION

This invention pertains to optical filters comprising tunable electro-optical modulators within a folded optical path structure, in some cases using liquid crystal materials as tuning elements.

BACKGROUND OF THE INVENTION

Extremely narrow bandwidth optical filters can be based on birefringent elements and the interference of polarized light. In addition to high spectral resolution, such filters provide a wide field of view and tunability. The two basic designs are the Lyot-Öhman and the Šolc filters (see, for example, A. Yariv and P. Yeh, *Optical Waves in Crystals*, Wiley, N.Y., 1984, 133–143). Rapidly tunable birefringent filters of the Lyot design have been demonstrated (Johnson et al., U.S. Pat. No. 5,132,826). Lyot filters consist of multiple birefringent elements with retardation which increases geometrically in powers of two for successive stages. The stages are separated by parallel polarizers. Throughput is reduced by the multiple polarizers and, because the birefringent plates have different retardations, the Lyot filter does not lend itself to a multipass configuration.

A birefringent filter which overcomes these limitations is the multiple retarder Šolc filter. A Šolc filter requires input and exit polarizers, and a series of identically thick wave plates which are half-wave or full-wave retarders at the design wavelength. For the folded Šolc filter configuration, these are half-wave plates oriented at alternating rocking angles $+\rho$, $-\rho$ along the direction of propagation. At the design wavelength, i.e. the wavelength at which the retarders are half-wave plates, the polarization is reflected about the optic axis of each wave plate. The term "reflection of polarization" about an axis is used in the art to refer to a rotation of the polarization by $2\theta$, from an orientation of $\theta$ with respect to the axis to an orientation of $\theta$. By choosing the rocking angle to be $\rho = \pi/4N$, where N is the number of wave plates, light at the design wavelength is rotated by 90° while light at other wavelengths does not experience a 90° rotation. Thus an exit polarizer at 90° to the input polarization transmits a narrow spectral peak centered at the design wavelength. The transmission spectrum contains a series of peaks for every wavelength which satisfies the half-wave condition of the retarders, and additional blocking filters can be employed to select a specific peak. The spacing between these peaks is the free spectral range of the Šolc filter. For the fan Šolc filter configuration, the wave plates are full-wave rather than half-wave retarders at the design wavelength. They are oriented at $\rho$, $3\rho$, $5\rho$, ... and the polarizers are parallel to one another. In this configuration light at the design wavelength is unaltered by the waveplates while the polarization of light at other wavelengths is rotated off the axis of the polarizers. When $\rho = \pi/4N$ the maximum discrimination is achieved.

A Šolc filter can be implemented by multiple passes through a Fabry-Perot cavity as first proposed by J. Katzenstein (J. Opt. Soc. Am., 58, 1348, 1968). This greatly reduces the required number of birefringent elements and, since the series of wave plates is replaced by a single plate, the requirements of uniform plate retardance and orientation are automatically satisfied. The filter can be tuned by varying the retardation of the center wave plate, for example by electro-optic means, to select the wavelength at which it provides a half or full wave of retardation.

The filter can be constructed with three intracavity birefringent plates: a central retarder with quarter-wave plates on either side (J. H. Williamson, J. Opt. Soc. Am., 61, 767 (1971)). The central retarder is oriented at the rocking angle $\rho$. The first quarter-wave plate is oriented with optic axis parallel to the input polarizer and the second is parallel to the exit polarizer. The quarter-wave plates function as passive rotators. That is, light passing through a quarter-wave plate, reflected from a mirror and passing again through the quarter-wave plate has traveled an optical path equivalent to a single pass through a half-wave plate and the polarization is rotated about the wave plate optic axis. This rotation allows the optical field to see the central retarder as a series of wave plates at $+\rho$ and $-\rho$ as required for a folded Šolc filter, and at $\rho$, $3\rho$, $5\rho$ ... for the fan filter.

According to mathematical analyses by Weis and Gaylord (R. S. Weis and T. K. Gaylord, J. Opt. Soc. Am. A, 4, 1720, 1987) it should be possible to use polarization interference and Fabry-Perot interference effects synergistically in a multipass Šolc device to provide a high resolution tunable filter. Using matrix methods for analysis they predict that the transmission spectrum is the product of the Fabry-Perot fringes and the Šolc filter transmission function. Thus the peaks which satisfy the Šolc polarization-interference condition form an envelope for the Fabry-Perot fringe intensities. If the half-width of the Šolc envelope is less than the free spectral range (FSR) of the cavity resonances, then only one Fabry-Perot peak falls within the Šolc envelope. Thus the FSR of the filter is the Šolc envelope peak spacing rather than the Fabry-Perot fringe spacing and the effective finesse of the filter can be extremely large. A variable isotropic spacer can be employed to tune the optical path length and thereby tune the cavity resonances.

The wavelengths of the polarization-interference transmission peaks can be tuned by changing the retardation of the central retarder. This can be implemented by various methods. Temperature and mechanical tuning techniques are inherently slow. Electro-optic tuning of the birefringence with applied electric field is more rapid. Weis and Gaylord modeled the electro-optically tuned Fabry-Perot Šolc filter using $LiNbO_3$ for the spacer layer and either $LiNbO_3$, $KNbO_3$, or $Hg_2Cl_2$ for the central retarder. They predict a filter linewidth of 0.01 nm, which is two orders of magnitude narrower than available isotropic thin-film narrow-band filters. The limitation in these materials comes in the tuning range. For full tuning over the FSR of the Šolc envelope the central retarder must be tunable over $2\pi$ in retardation. The tuning range of the birefringence depends on the material properties, the applied electric field, and the plate thickness. Even with a material breakdown limited maximum applicable electric field of $10^7$ V/m, plate thicknesses on the order of hundreds of microns are required for the electro-optic materials employed by Weis and Gaylord to achieve a full cycle of retardation change. This reduces the FSR of the Fabry-Perot fringes and limits the ability to design the cavity to select free spectral range, finesse, and out-of-band rejection according to the requirements of the application.

These constraints can be overcome by the use of liquid crystal variable retarders, as described in the present invention. Liquid crystal molecules are long organic structures characterized by a molecular director which re-orients in response to an applied electric field. An optical field interacting with a liquid crystal cell experiences varying retardation when the motion of the molecular director is out of the plane of the optical field. Achieving variable retardation is a function of the alignment of the crystal within the plates which contain the liquid, the placement of electrodes parallel or lateral to these plates, and the direction of light propagation through the ends or sides of the cell. Liquid crystal cells can be tuned over $2\pi$ in retardation with modest voltages and film thicknesses.

Nematic liquid crystal cells can provide analog retardation changes with the application of an electric field. Typical tuning speeds for nematic materials are 10–100 msec. Chiral smectic liquid crystals (CSLC's) are characterized by rotation time constants as short as 100 nsec, six orders of magnitude faster than the nematic materials. Homeotropically aligned CSLC's provide retardation changes with application of an electric field parallel to the containing plate. However this requires lateral electrodes, which may limit the device aperture. Surface stabilized planar aligned CSLC cells are constructed with transparent electrodes parallel to the containing plate and thus can have a large clear aperture. However, because the molecular director rotates in the plane of the containing glass plates, and therefore the plane of the optical field, there is no change in retardation with the application of an electric field. Consequently, these wave plates can be modeled as mechanically rotatable fixed-retardation wave plates. Variable retardation can be achieved by the use of three wave plates: a rotatable CSLC half-wave retarder and two quarter-wave plates, as described by Biernacki et al. (Proc. SPIE 1455, 167, 1991) and by Sharp et al. (U.S. patent application 07/792,284 filed Nov. 14, 1991). For a liquid crystal with a tilt range of at least $\pi/2$, this quarter-half-quarter compensator can achieve variable retardation between 0 and $2\pi$. In contrast to single element birefringent retarders, the polarization of linearly polarized light is preserved.

Liquid crystal cells have been utilized in a number of optical filters. A Fabry-Perot etalon filter with a nematic liquid crystal cell changes the optical path length and thus tunes the Fabry-Perot fringe wavelengths, but lacks the Šolc polarization-interference to select among the fringes (M. W. Maeda et al., IEEE Photonics Technology Lett. 2, 820, 1990) and A. Miller et al. in U.S. Pat. No. 4,790,634 and J. S. Patel in U.S. Pat. No. 5,068,749). Tunable birefringent Lyot filters have been realized with nematic liquid crystal cells (W. I. Kaye in U.S. Pat. No. 4,394,069) and with chiral smectic liquid crystals (Johnson, op. cit.). However, because the elements require a progression of retardations, these have not been implemented in a multipass configuration.

SUMMARY OF THE INVENTION

The present invention provides a multipass Šolc filter in which liquid crystal cells are used as the opto-electronic tuning element. In the filter of this invention the Šolc polarization-interference effects are used synergistically with the Fabry-Perot cavity resonances to create a high resolution tunable filter. The multipass Šolc filter of this invention comprises an etalon containing (1) a central retardier which provides a half or full wave of retardation at the filter design wavelength, (2,3) two quarter wave plates which serve to reflect the polarization of the intracavity light about an axis between successive passes through the central retarder, and (4) an optional isotropic spacer which adjusts the optical path length and thereby the wavelengths of cavity resonance. The filter requires linearly polarized input light and an analyzer for polarized output light.

For the folded Šolc filter, the central retarder is a half-wave plate oriented at a rocking angle, $\rho$, with respect to the direction of input polarization, and the reflection of the polarization of light by the quarter-wave plates about the direction of input polarization allows the intracavity light to interact with the central retarder at alternating angles of $+\rho$ and $-\rho$ on successive passes. The half-wave retarder reflects the polarization light at the design wavelength about the wave-plate optic axis and after $N=\pi/4\rho$ passes (where N is an integer) through the filter the light is linearly polarized and has been rotated by $\pi/2$. In contrast, light at other wavelengths is rendered elliptically polarized with only a small component at $\pi/2$. Thus the design wavelength is selectively transmitted by an analyzing polarizer oriented at 90° to the input polarization.

In the fan Šolc filter the central retarder is a full-wave plate at angle $\rho$ and the quarter-wave plates are oriented to reflect the polarization of intracavity light so that it interacts with the central retarder at $\rho$, $3\rho$, $5\rho$ . . . on successive passes. After $N=\pi/4\rho$ passes light at the design wavelength is rotated to $\pi/2+2\rho$ and is selectively transmitted by an analyzing polarizer with this orientation. This is in contrast to the multiple retarder in-line (non-multipass) fan Šolc filter wherein the input and exit polarization are the same. The difference is due to the reflections of the polarization by the quarter-wave plates, required to change the relative orientation of the central retarder on successive passes, and has no effect on filter function.

The optoelectronic tuning elements of this invention can be located in the central retarder to provide tuning of the polarization-interference Šolc envelope, or in the isotropic spacer to provide tuning of the Fabry-Perot cavity resonances. Depending on the application, either the central retarder, the isotropic spacer, or both can be tunable. Liquid crystal cells offer a significant improvement over the optoelectronic materials of the prior art because $2\pi$ of retardation can be achieved with cell thicknesses on the order of microns compared to hundreds of microns required for previously proposed materials. The reduced cell thickness also reduces the voltage required for tuning. An optional fixed retarder aligned with the variable retarder is included as an aspect of this invention to allow independent selection of the order of the retarder and thereby the free spectral range (FSR) of the Šolc envelope. An optional isotropic spacer allows independent selection of the Fabry-Perot FSR. These features of the filter of this invention make it possible to tailor the free spectral range of the Šolc envelope and of the Fabry-Perot fringes to the specific application whereas in the prior art they were constrained by the material thicknesses required. Criteria for designing filter parameters to meet resolution, out-of-band discrimination, and tuning range requirements are provided.

The liquid crystal variable retarder in the present invention can be made with known liquid crystal materials including but not limited to nematic liquid crystal cells, homeotropic liquid crystal cells, or three element quarter-half-quarter variable retarders with a chiral smectic liquid crystal (CSLC) rotatable half-wave plate. A tunable isotropic spacer can be provided by a quarter-half-quarter CSLC variable retarder wherein the optical path length is tuned but, since the polarization is preserved, the retarder appears isotropic.

Novel cavity configurations are provided as an aspect of this invention. In most of the prior art of Fabry-Perot Šolc filters, the etalon operates in transmission-reflection mode wherein the light enters through a front partially reflective surface, undergoes multiple internal reflections, and exits through a back partially reflective surface. Configurations are provided in the present invention wherein the back reflective surface is approximately completely reflective and the light both enters and exits through the front reflective surface. Because of the bilateral symmetry of the Šolc filter (quarter-wave plate, central retarder, quarter-wave plate) and of each of these elements (single birefringent retarder or quarter-half-quarter variable retarder), reflection-mode configurations require only half of the intracavity elements. The optical effect of a single pass through the transmission mode configuration is achieved after a forward and return pass through a reflection-mode configuration.

Exemplary reflection-mode configurations include (1) a V-shaped path wherein the light exits through the front reflective surface spatially separated from the input light, (2) a device wherein the input and output light are coincident at the front reflective surface, and (3) a discrete multipass filter wherein the light "walks" through the intracavity elements and the exit is spatially separate from the entrance. This invention includes these configurations with both liquid crystal and other birefringent materials.

BRIEF DESCRIPTION OF THE DRAWINGS

FIG. 5A, 5B and show schematic representations of reflection-mode devices. In FIG. 5A the input and output light are spatially separated at the front reflective surface. In FIG. 5B the input and output light are coincident. In FIG. 5C the reflective surfaces provide a discrete number of passes rather than forming an etalon.

DETAILED DESCRIPTION OF THE INVENTION

The term Fabry-Perot cavity is used herein to describe an etalon with reflective surfaces separated by a fixed distance, d, wherein the intracavity light can be treated as an infinite number of partial waves produced by the reflections at the two surfaces. At optical resonance, the phase delay attributed to one round trip is an integral number of wavelengths, i.e. $2d=m\lambda/n$, where n is the average index of refraction of the cavity and m is an integer. This resonance condition is satisfied at a series of wavelengths and these transmission peaks are termed Fabry-Perot fringes of order m. The free spectral range is the spacing between these peaks. When the cavity contains birefringent elements, there are two series of fringes due to the ordinary and extraordinary (O and E) refractive indices of these elements. Multipass cavities are referred to as folded optical path devices, as distinct from the term folded Šolc filter, which specifically refers to the alternating orientation of the series of wave plates at rocking angles $+\rho$ and $-\rho$.

In a Fabry-Perot etalon in transmission-reflection mode, both reflective surfaces are partially reflective, i.e. the reflectivity, R, of each surface is less than one, such that the light enters through one reflective surface, undergoes multiple internal reflections, and a portion which satisfies the cavity resonance condition exits through the other reflective surface. In the exemplified configuration the reflective surfaces are planar and parallel and the light enters at normal incidence. As is known in the art, the same function can be obtained with other cavity geometries which comprise, for example, angled or curved mirrors and different angles of incidence for the input light.

Reflection mode cavities comprise one partially reflective surface and one completely reflective surface, $R\approx 1$, where it is understood that totally reflective surfaces can not be manufactured and so this is an approximation. Light enters through the partially reflective surface, undergoes multiple internal reflections, and exits through the same partially reflective surface. In such a configuration, to utilize the Fabry-Perot resonance the input and output light beams must be spatially separated at the partially reflective surface to provide discrimination against light which does not satisfy the cavity resonance condition.

The term liquid crystal cell is used herein to refer to transparent or semi-transparent cells containing a liquid crystal material which functions to retard the light passing through the cell. Either the retardation or the orientation of the optic axis can be varied on application of an electric field to cell electrodes. Cells are typically formed of uniformly-spaced transparent or semi-transparent retaining walls of an inert substrate, such as glass or quartz. A conducting material is typically coated on the inside surface of the substrate walls to provide transparent, semi-transparent or reflecting electrodes. Homeotropically aligned cells employ lateral electrodes. A composition of liquid crystal materials is inserted between the uniformly-spaced electrodes and for some materials a method of alignment of the liquid crystals is employed.

One preferred alignment for chiral smectic liquid crystal cells is the "bookshelf" geometry in which smectic layers are oriented perpendicular to the substrate walls and the optic axis is in the plane of the substrate walls, as described by N. A. Clark and S. T. Lagerwall in Applied Phys. Lett. 26, 899, 1980. When incorporated in a bookshelf geometry cell, analog CSLC materials, such as SmA* (S. T. Lagerwall et al. in U.S. Pat. No. 4,838,663) and distorted helix ferroelectrics, DHF (L. A. Beresnev et al., European Patent Application No. 309774, published 1989), display an analog rotation of the cell optic axis in the plane of the cell walls upon application of an electric field across, i.e. parallel to, the smectic layers by electrodes parallel to the cell walls. In a discrete, multi-state cell, for example using ferroelectric SmC* or SmH* (N. A. Clark et al. in U.S. Pat. No. 4,367,924 and U.S. Pat. No. 4,563,059) or antiferroelectric phases (see for example I. Nishiyama et al., Jpn. J. App. Phys. 28, L2248, 1989), application of an electric field above a certain threshold voltage results in switching of the orientation of the CSLC molecules between discrete stable states.

Homeotropic alignment refers to cells in which the smectic layers are parallel to the substrate walls. The optic axis of the CSLC material rotates in a plane perpendicular to the cell walls on application of an electric field across the smectic layers by electrodes that are lateral to the substrate walls (Sharp, et al., U.S. Ser. No. 07/792284 and S. Garoff and R. B. Meyer, Phys. Rev. Lett. 38, 848, 1977). The homeotropically aligned CSLC cell functions as a variable retarder rather than as a rotatable retarder with fixed retardation. It has the simplicity of design of the nematic liquid crystal cell but the response time of the CSLC's. Disadvantages arise from the need for lateral electrodes. This increases the voltage required to obtain a given field and can reduce the aperture.

Figure 1:
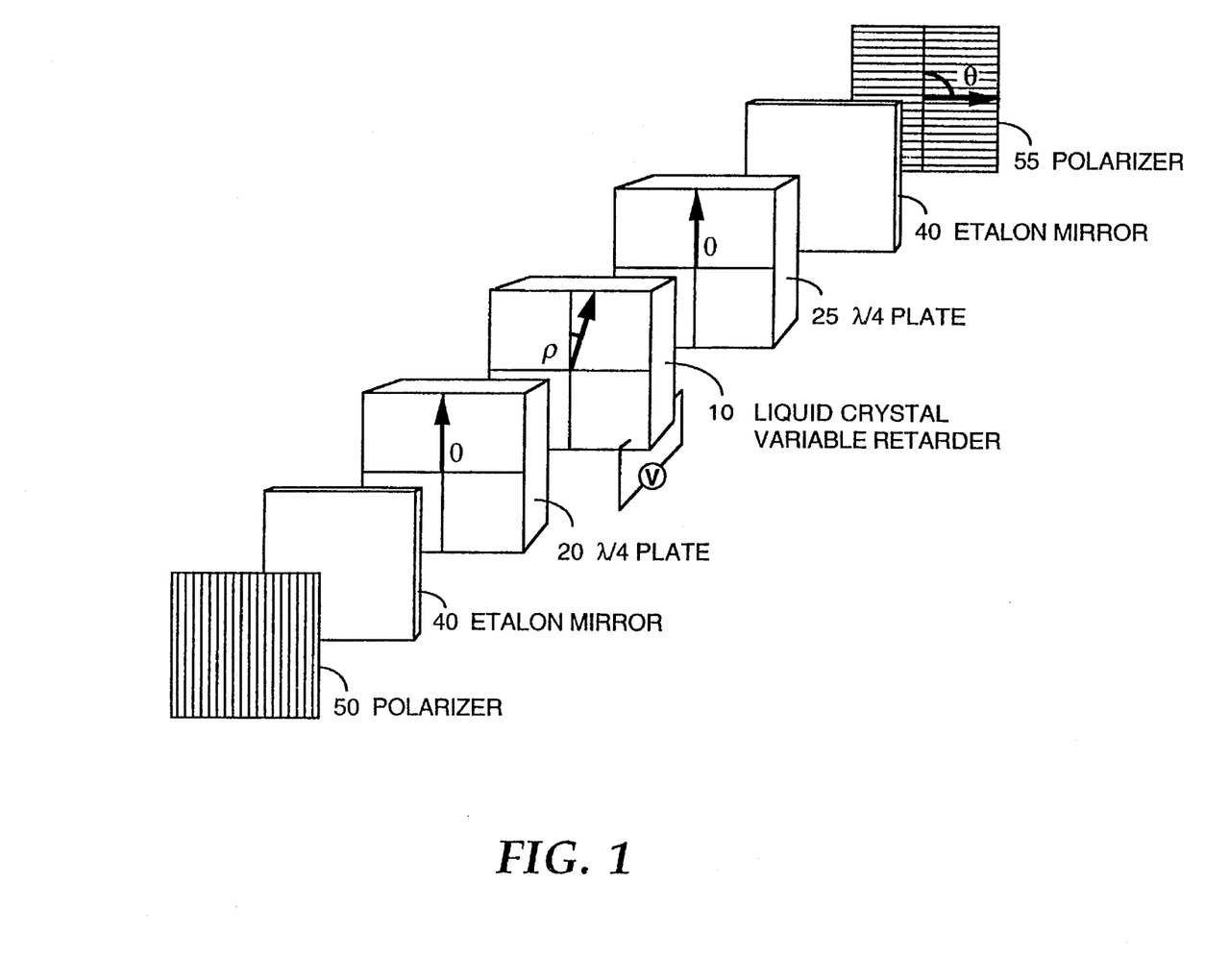
FIG. 1 is a schematic representation of a Fabry-Perot folded Šolc filter.

Referring now to the drawings, like numbers indicate like parts and the same elements in different figures have the same numbers. FIG. 1 is an exemplary embodiment of the Fabry-Perot folded Šolc filter. The filter comprises variable retarder 10 oriented at rocking angle, $\rho$, with respect to the direction of the input polarization. The term orientation of an optical element is taken to mean the orientation of its optic axis. The wavelength of the filter transmission is tuned by varying the retarder to select the wavelength at which it provides a half-wave of retardation. The function of the half-wave retarder is to reflect the polarization of intracavity light at the design wavelength about the optic axis of the wave-plate. In other words, light entering the half-wave plate with polarization at an angle $\beta$ with respect to the optic axis of the half-wave plate exits with polarization at an angle $-\beta$. In the embodiment shown in FIG. 1, this retarder is a liquid crystal cell.

On either side of the variable retarder are quarter wave plates 20 and 25. They can be oriented either parallel or perpendicular to the polarization of input light. The function of the quarter-wave plates is to reflect the polarization of intracavity light at the design wavelength about the axis of polarization of the input light such that the intracavity light interacts with the variable retarder at alternating angles $+\rho$ and $-\rho$. This is achieved after a double pass through the quarter-wave plates, as provided by the cavity geometry, which makes them optically equivalent to a single pass through a half-wave plate. This function could also be performed by Faraday rotators at the expense of cavity path length and device simplicity. To perform this function, these quarter-wave plates are preferably achromatic over the tuning range of the filter, i.e. they should provide a reflection of polarization about their optic axis regardless of the wavelength of light. With zero-order quarter-wave plates, for example tantalum pentoxide deposited with the form-birefringence technology (T. Notohiro and Y. Taga, J. Appl. Opt. 28, 2466, 1989), 30–50 nm of achromaticity is possible. The requirement for achromatic quarter-wave plates was not appreciated in the prior art of multiple pass Šolc filters.

The Fabry-Perot cavity is formed by reflective surfaces 40. These surfaces could be, for example, dielectric mirrors, metallic mirrors, or prisms. The reflectivity of these surfaces determines the cavity finesse and also dictates the optimum rocking angle of the variable retarder. In the simplest terms, as the reflectivity of these surfaces increases, the average number of passes, N, through the cavity increases, and the rocking angle, $\rho=\pi/4N$, decreases. Proper optimization of $\rho$ requires consideration of cavity losses and Fabry-Perot resonances as well. It is preferred for use in high finesse applications that mirrors 40 have R>0.85 and that $\rho<5°$.

The folded Šolc filter requires extra-cavity polarizing elements 50 and 55. Polarizer 55 is oriented at $\Theta=\pi/2$, orthogonal to polarizer 50. These could be polarizers, polarizing beam splitters, or other means of analyzing polarization. If the source light is linearly polarized, the input polarizer can be omitted. Extra-cavity blocking filters, not shown, can also be employed to select among the peaks of the Šolc envelope.

The design of FIG. 1 also describes a fan Šolc filter when the following angles and retardations are employed. Variable retarder 10 is a full-wave retarder at the design wavelength. Exit polarizer 55 is oriented at $\Theta=\pi/2+2\rho$, and quarter-wave plate 25 is oriented at $\pi/2+2\rho$ or $2\rho$. As in the fan version, $\rho=\pi/4N$.

Quarter-wave plates 20 and 25 can be replaced by Faraday rotators with rotations of $-\rho$ and $-\rho$ for the fan and $-\rho$ and $+\rho$ for the folded filter. In this case, because of the initial transit through a rotator, the input polarization must be at $\rho$. Similarly, because of the final transit through a rotator, the exit polarizer must be oriented at $\theta=90°+\rho$ for both the fan and folded filters as opposed to $\theta=90°+2\rho$ and $90°$, respectively. Analogous changes in the orientations of the polarizers are required in all the following embodiments when Faraday rotators are employed.

If the variable retarder is a nematic liquid crystal cell, this filter is particularly simple in construction. It can consist of a pair of glass plates with a reflective, conductive coating and a further quarter-wave plate coating. A spacer between the glass plates and an injection of the liquid crystal material complete the cell. The homeotropically aligned CSLC cell is similarly constructed but with lateral electrodes.

Figure 2:
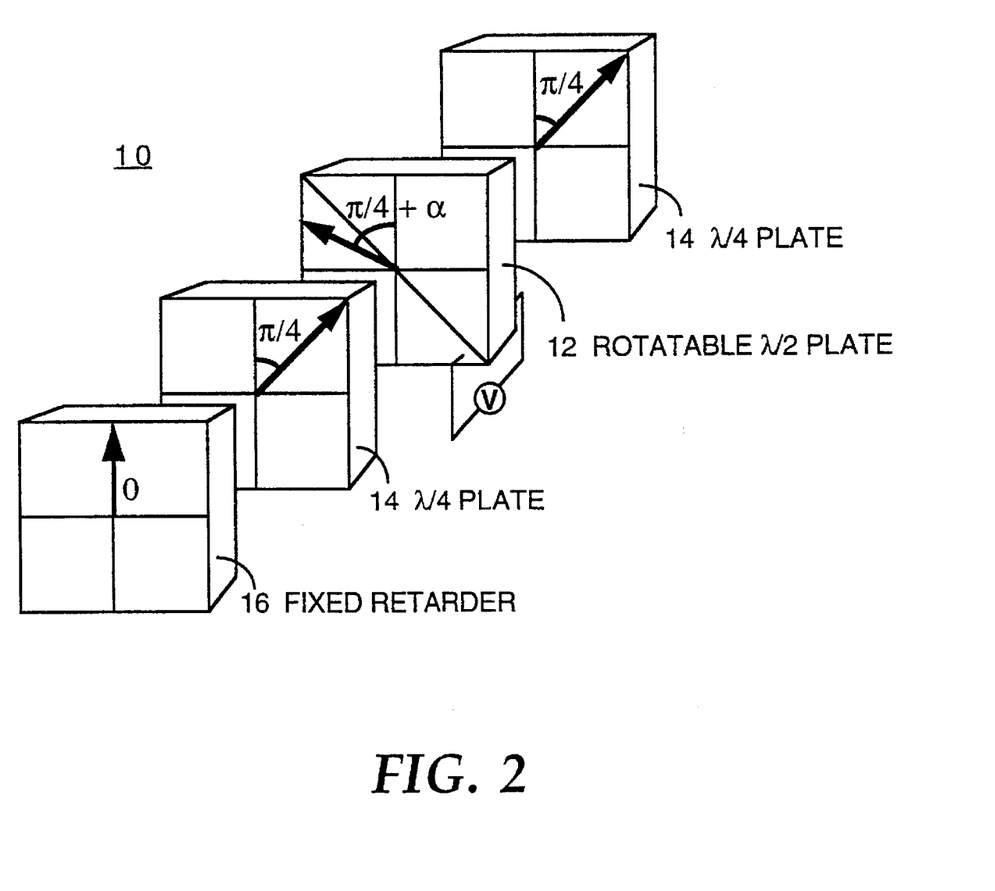
FIG. 2 is a schematic representation of a planar aligned chiral smectic liquid crystal quarter-half-quarter variable retarder.

Planar aligned smectic liquid crystals can be employed using the variable retarder of FIG. 2. All four elements of FIG. 2 together comprise the variable retarder 10 of FIG. 1. Application of an electric field to CSLC cell 12 rotates the molecular director by $\alpha$ in the plane of the containing glass plates and so the cell operates as a rotatable fixed retarder rather than as a variable retarder. However, the sequence quarter-wave plate 14, rotatable half-wave plate 12, quarter-wave plate 14 acts as a variable retarder. This sequence of wave plates can be modeled with Jones matrix algebra as the product of the Jones matrices for the three wave plates:

$$E'/E = W(\pi/2,\pi/4)W(\pi,-(\pi/4+\alpha))W(\pi/2,\pi/4)$$

$$= e^{i\gamma}\begin{bmatrix} e^{-i2\alpha} & 0 \\ 0 & e^{i2\alpha} \end{bmatrix}$$

where $\gamma$ is the common phase factor of the cavity. This may be recognized as the expression for a general wave plate at 0° with retardation $\Gamma=4\alpha$. In the illustrated configuration, when there is no field applied to the cell, $\alpha$ is zero and the quarter-half-quarter sequence has zero retardation. For linearly polarized light, the polarization is preserved by this variable retarder. The entire sequence of plates in the variable retarder of FIG. 2 must be rotated by the rocking angle $\rho$ for use in the Šolc filter. As with the quarter-wave plates 20 and 25, it is preferred for wave plates 12 and 14 to be achromatic over the tuning range. The quarter-wave plates can also be CSLC cells to make a rotatable variable retarder wherein both the retardation of the quarter-half-quarter retarder and its orientation angle, ρ, can be varied.

The quarter-half-quarter variable retarder can optionally include a fixed retarder 16. Liquid crystal retarders can be constructed to be zero-order and so this fixed retarder allows independent control of the order of the variable retarder and thereby of the free spectral range of the Šolc polarization-interference envelope. This is an important aspect of this invention because it allows flexibility in filter design to choose resolution and tuning range. The fixed retarder can be included in conjunction with the homeotropically aligned CSLC or nematic liquid crystal variable retarder as well as with the CSLC quarter-half-quarter retarder. Preferred materials for the fixed retarder are those with large birefringence, such as calcite or the previously mentioned metal oxides, so that the cavity length is not significantly increased.

Many CSLC materials are suitable for the variable retarder. These include ferroelectric SmC* and SmH*, non-ferroelectric SmA*, antiferroelectric liquid crystals, and DHF liquid crystals, as are known in the art. In discrete state CSLC's, such as SmC*, application of an electric field above threshold selects between stable discrete orientations of the molecular director. These have the advantage of being insensitive to the precise magnitude of the electric field and of maintaining their orientation in the absence of an applied field. Analog CSLC's, such as SmA*, can be continuously tuned up to a maximum tilt angle.

Figure 3:
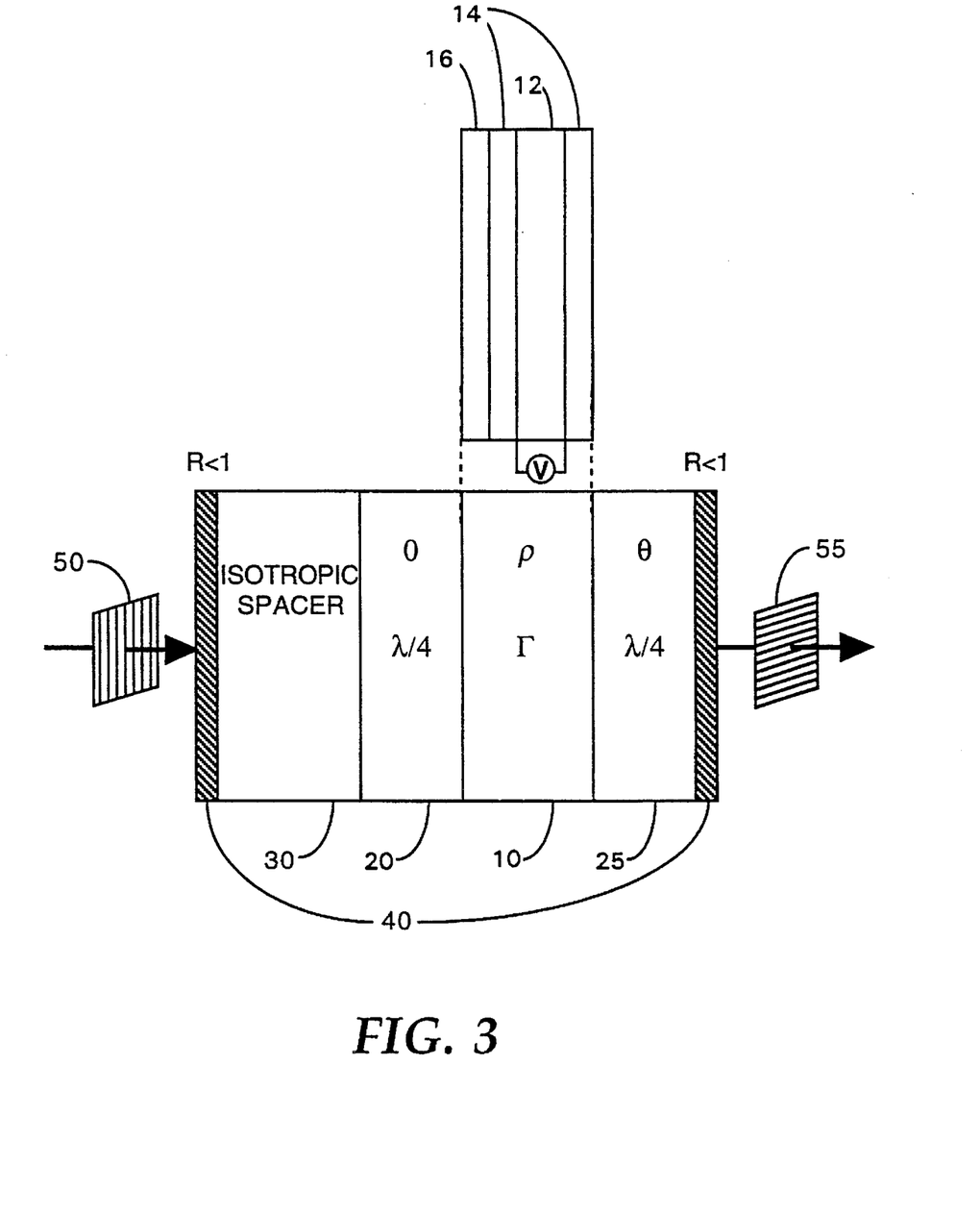
FIG. 3 is a schematic representation of a Fabry-Perot Šolc filter with a planar aligned chiral smectic liquid crystal variable retarder.

A further embodiment includes an isotropic spacer. FIG. 3 shows the Fabry-Perot Šolc filter of FIG. 1 with the addition of the isotropic spacer 30. The optical orientation and retardation are labeled on each element. The inclusion of the CSLC variable retarder (12, 14, and 16) is merely for illustration and does not limit the choices of a liquid crystal variable retarder. The isotropic spacer can be positioned anywhere in the cavity. The isotropic spacer alters the optical path length and thus the Fabry-Perot resonance condition of the cavity. To maximize transmission at a particular wavelength the ordinary and extraordinary cavity resonances are chosen to be coincident. Through an increase in the path length, the Fabry-Perot order of the cavity increases and thus the line width of the Fabry-Perot fringes decreases. The wavelengths of the Fabry-Perot fringes, and thus of the filter transmission peak, can be tuned via the isotropic spacer, for example through electro-optic, pressure, temperature, or mechanical means, as known in the art.

Figure 4:
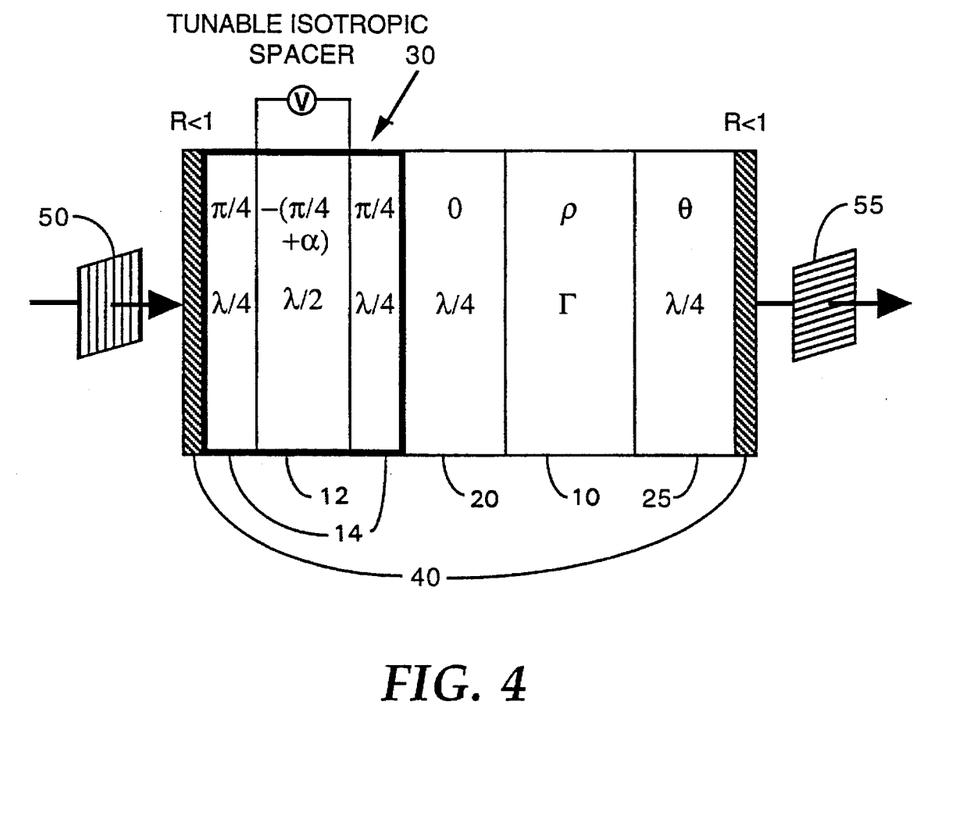
FIG. 4 is a schematic representation of a Fabry-Perot Šolc filter with a planar aligned chiral smectic liquid crystal tunable isotropic spacer.

An embodiment of the tunable isotropic spacer 30 comprises the quarter-half-quarter CSLC variable retarder (12 and 14), as shown in FIG. 4. Because the polarization of light is preserved by this retarder it appears isotropic. Rotation of the half-wave plate 12 changes the retardation of the spacer and thus changes the optical path length of the cavity and the wavelength of the cavity resonance. If the width of the Šolc envelope is chosen so that only one Fabry-Perot fringe is transmitted, then by tuning the isotropic spacer the filter can be tuned over the free spectral range of the Fabry-Perot fringes. If tunability over the Fabry-Perot free spectral range is sufficient for the application, the variable retarder 10 can be replaced with a fixed half or full wave retarder. This invention includes the use of a liquid crystal tunable isotropic spacer with any fixed and variable retarders, not limited to liquid crystal cells.

A further aspect of this invention is novel cavity configurations which include an approximately completely reflective back surface. In these configurations, the light both enters and exits at the front reflective surface, a geometry which can be advantageous in some applications. The intracavity elements of these reflection-mode configurations can be the same as in the previous devices or, by virtue of the bilateral symmetry of the Šolc filter, the cavity can be cut in half and a full filter stage achieved after a round trip transit, as shown in FIG. 5. The folded Šolc filter is preferred for the halved cavity devices because quarter-wave plates 20 and 25 of FIG. 3 can be parallel and thus provide the bilateral symmetry which allows the use of a single quarter-wave plate 20 in FIG. 5.

Figure 5A:
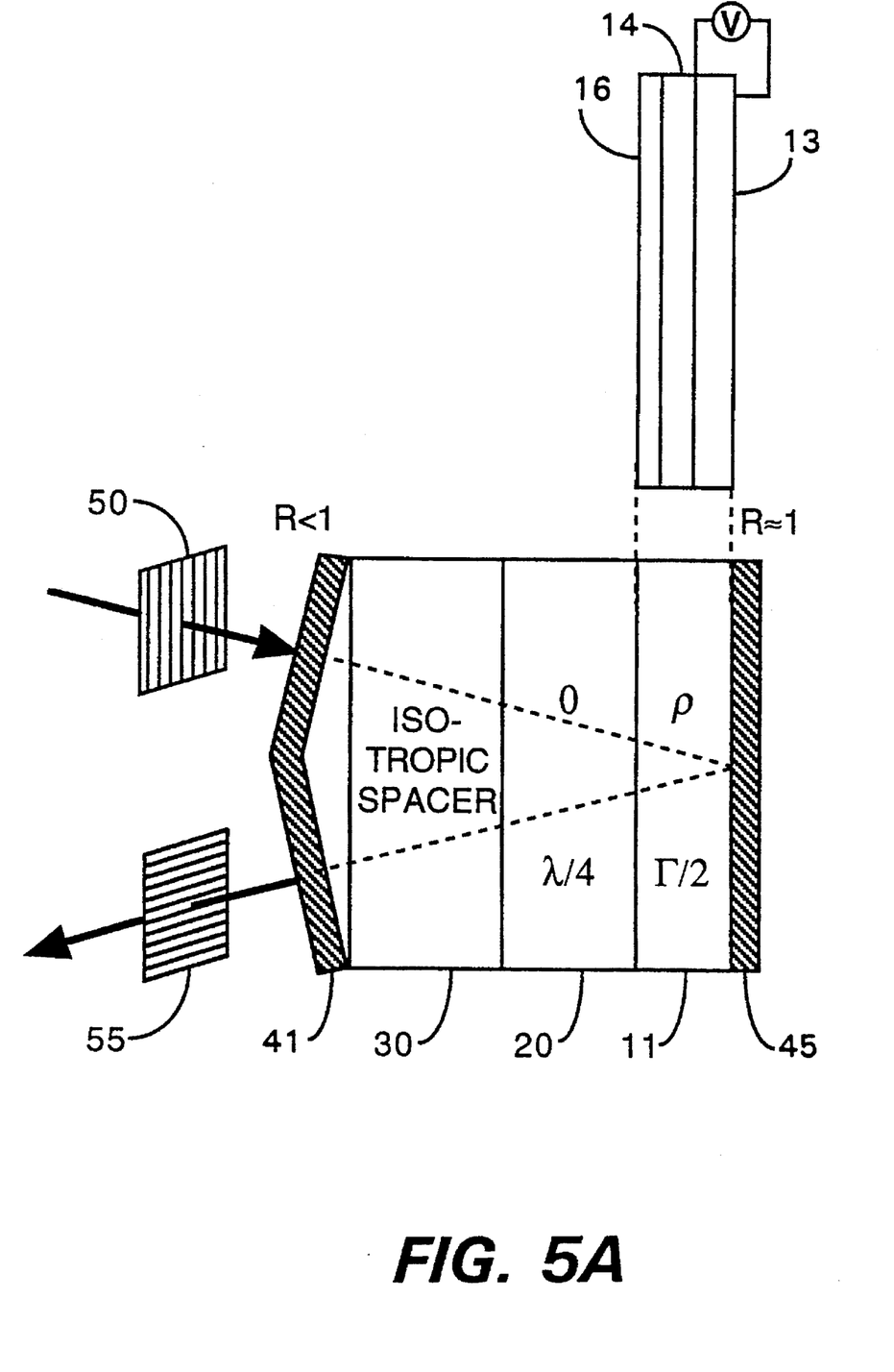

FIG. 5A illustrates a Fabry-Perot folded Šolc filter with an approximately completely reflecting back reflective surface 45. The cavity comprises a single quarter-wave plate 20 oriented at 0° or 90° to the polarization of the input light, a variable retarder 11 oriented at ρ, and an optional isotropic spacer 30. The variable retarder has half the retardation of the transmission mode device variable retarder, such that in a double pass it provides a half-wave of retardation at the design frequency. The halved version of the quarter-half-quarter CSLC variable retarder is included for illustration. It comprises a single fixed quarter-wave plate 14, a rotatable quarter-wave plate 13, and an optional fixed retarder 16, such that a round trip transit through this retarder is identical to a single pass through the retarder of FIG. 2. Similarly, for filters with a liquid crystal quarter-half-quarter tunable isotropic spacer, the spacer elements can be halved. A V-shaped transit through the reflection-mode filter of FIG. 5A is identical to a single pass through the transmission-reflection mode filter of FIG. 3. In order to preserve both the Šolc polarization-interference conditions and the Fabry-Perot cavity resonance conditions, the cavity geometry, i.e. the angle of incidence of the light and the mirror configuration, must be designed so that the output light is spatially separated from the input light. This can be accomplished, for example, by using an angled reflective surface 41 as indicated in FIG. 5A. Because the reflective surface can also function as a cell wall in a liquid crystal cell, this element can be chosen to have a triangular cross section such that the interface with the intracavity elements is a flat surface. Other cavity geometries can achieve the same function.

Figure 5B:
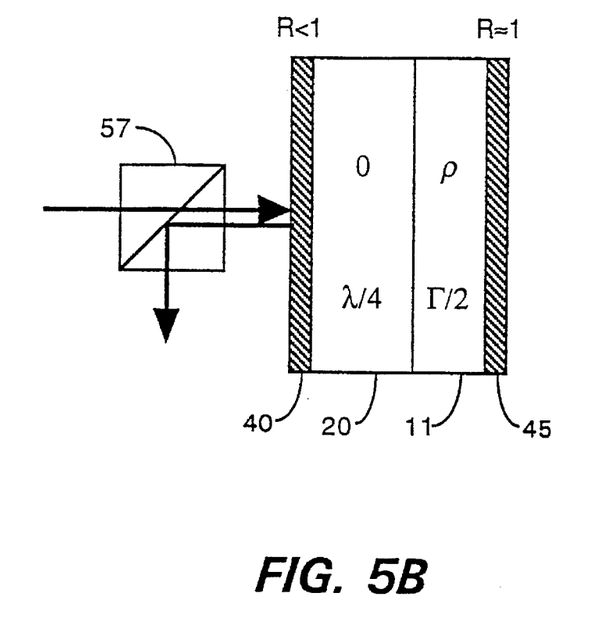

The reflection mode filter can also be operated with coincident input and output light as in FIG. 5B. Because the beams are coincident, cavity resonance is not discriminated in this configuration and only the polarization-interference effect is utilized. In comparison to the filter of FIG. 5A, the optional isotropic spacer is not employed. The crossed polarized output of this multipass Šolc filter is selected with a polarizing element such as a polarizing beam splitter 57. A variation of this invention is the use of absorptive intracavity elements to produce a "notch" filter which selectively absorbs the cavity resonance wavelengths rather than transmitting them.

Figure 5C:
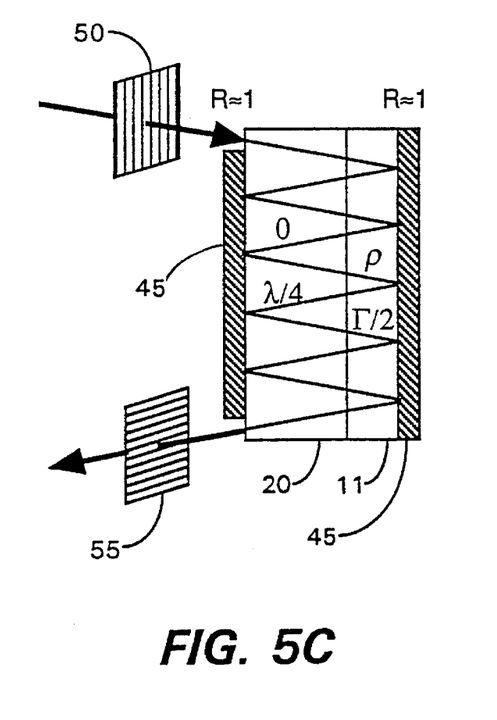

A discrete multipass filter can be constructed as in FIG. 5C. In this configuration, both the front and back reflective surfaces 45 are approximately completely reflective. The light enters at an angle such that it "walks" in discrete steps through the filter, in contrast to the previous embodiments of this invention which comprise an etalon with multiple interfering partial waves. The cavity comprises a single quarter-wave plate 20 oriented at 0° or 90° with respect to the input polarization and a variable retarder 11 oriented at ρ. Because the reflective surfaces do not form a cavity, no isotropic spacer is necessary. This filter is identical in function to a single pass multiple retarder Šolc filter, but with the economy of a multipass configuration. The aperture is reduced in this configuration.

A reflection configuration was proposed in the prior art (Katzenstein, op. cit.) with coincident input and output beams and a polarizing beam splitter. However, the prior art configuration differs from that of FIG. 5B in the use of only half of the intracavity elements. In addition, the prior art configuration did not employ the synergistic effect of the Fabry-Perot resonances and the polarization interference. As a consequence the prior art configuration did not include a means to spatially separate the input and output beams as shown in FIG. 5A.

The present invention includes novel reflection-mode multipass Šolc filters, as exemplified above, with any optical materials, not limited to liquid crystal cells. Either the central retarder or the isotropic spacer, or both, can be tunable. The reflection-mode cavity can contain the same elements as in the transmission-reflection mode devices of this invention, or it can contain only half of these elements and achieve a full stage of filtering after a forward and return transit. The ability to reduce the intracavity elements is a significant benefit of this aspect of the invention.

More than one of the required functions of the filters of this invention can be performed by a single filter element. For example, the reflective surfaces can also serve as electrodes for tuning an electro-optic element. Elements such as the polarizers or cell walls can be made of materials which also function as blocking filters. In the reflection mode devices, the functions of quarter-wave plates 20 and 25 are performed by a single quarter-wave plate 20. Similarly, more than one element can be required to perform a single function, such as the quarter-half-quarter wave plate combination as the variable retarder.

To illustrate the versatility and the design criteria of the present invention, the basic principles of operation of the Fabry-Perot Šolc filter were derived using a simplified 2×2 Jones calculus. This approach neglects reflected field components due to interfaces between layers but it does allow the determination of closed-form solutions, which is useful for sketching design parameters. The calculated transmission is a function of the rocking angle, $\rho$, the mirror reflectivity, R, the order and the retardation, $\Gamma$, of the variable retarder and the round trip phase delay, $2\phi$. Simulations of the filter of FIG. 1 have been made using this transmission function and are exemplified in FIGS. 6-8. FIG. 6 shows that the transmission function is the product of the Fabry-Perot fringes 110 and the Šolc envelope 120. Note that the transmission intensity as a function of wavelength is plotted on a logarithmic scale to emphasize the out-of-band rejection.

Figure 6A:
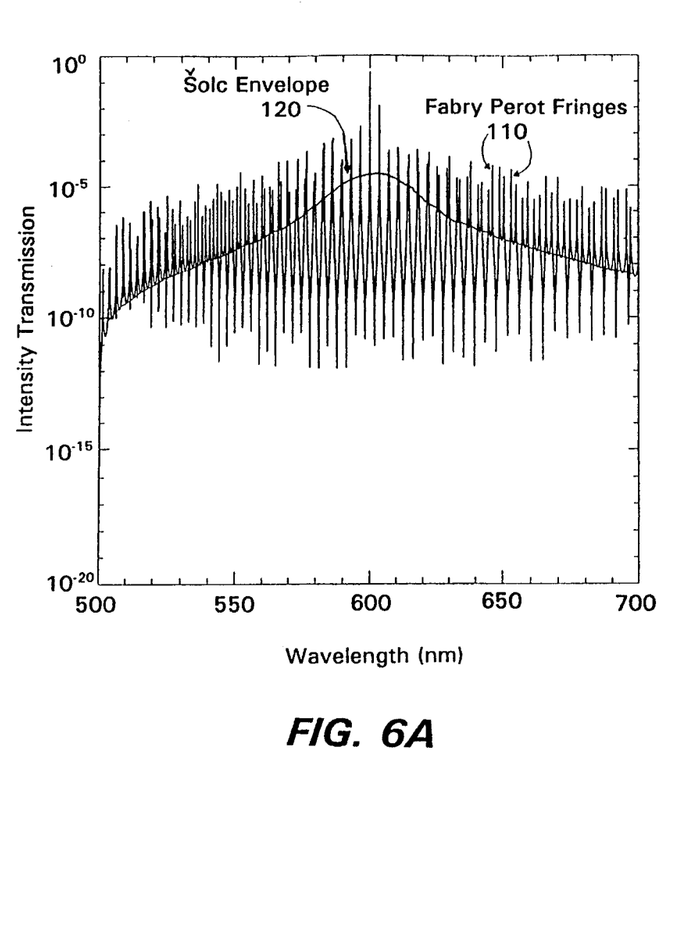
FIG. 6A and 6B show calculated transmission spectra for Fabry-Perot Šolc filters with an optical path length of $2\phi=170\lambda$ (at $\lambda=600$ nm) and with variable retarder orders of 4 (FIG. 6A) and 10 (FIG. 6B).
Figure 6B:
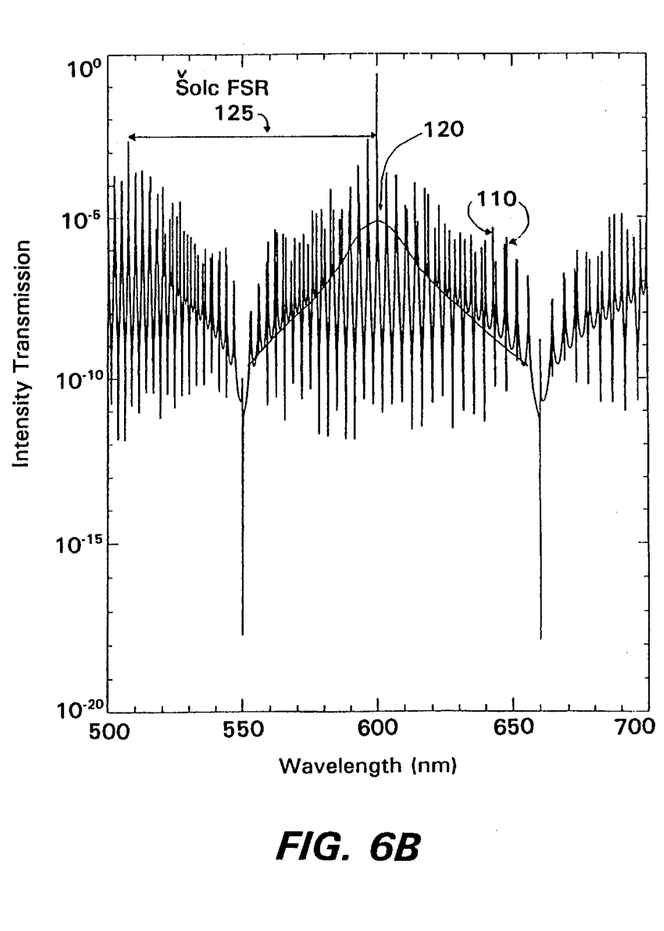

FIG. 6 further shows how the desired free spectral range of the multi-pass Šolc filter is obtained by adjusting the order of the variable retarder. In FIG. 6A the order of the variable retarder is 4 while in FIG. 6B the order is 10. For each of the views, the optical path length of the device is $2\phi=170\lambda$ for a design wavelength of 600 nm. FIGS. 6A and 6B can be compared to show that the higher the order of the variable retarder, the smaller the Šolc polarization-interference FSR 125.

Figure 7A:
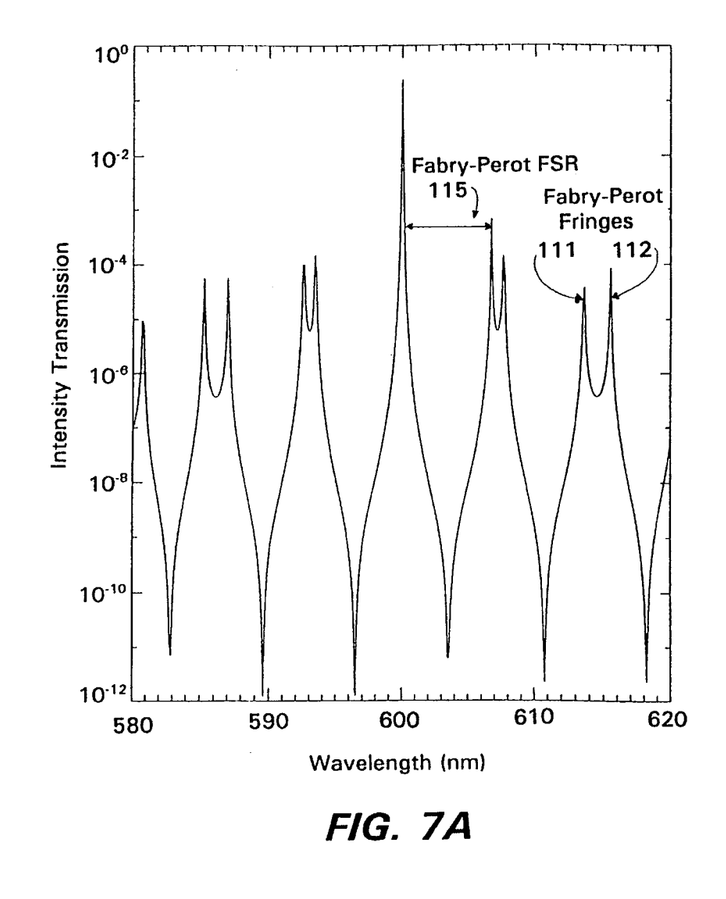
FIG. 7A and 7B show calculated transmission spectra for Fabry-Perot Šolc filters with variable retarder order 10 and optical path lengths of $2\phi=85\lambda$ (FIG. 7A) and $170\lambda$ (FIG. 7B) at $\lambda=600$ nm.
Figure 7B:
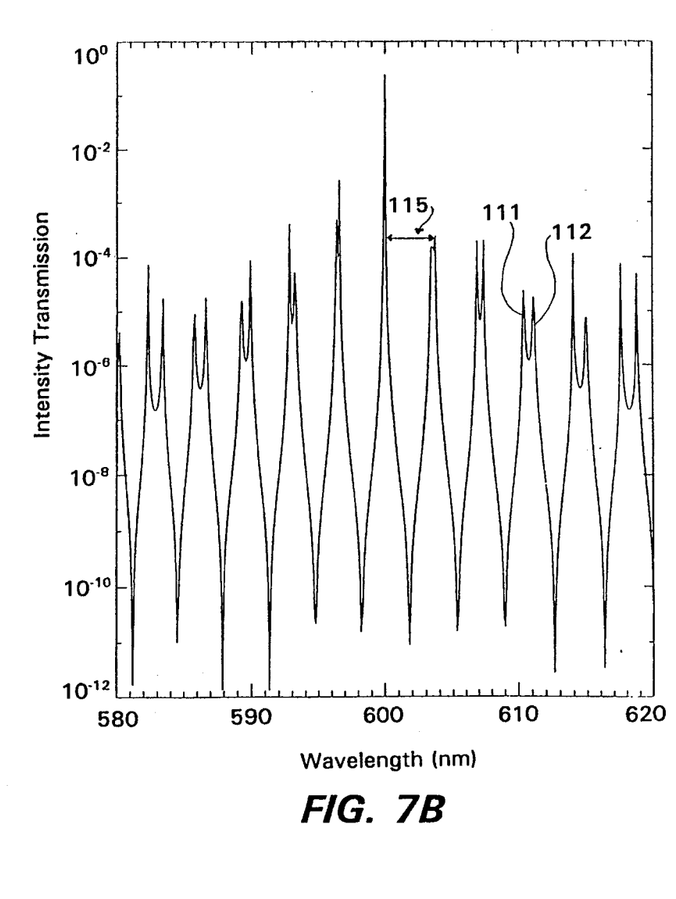
Figure 8:
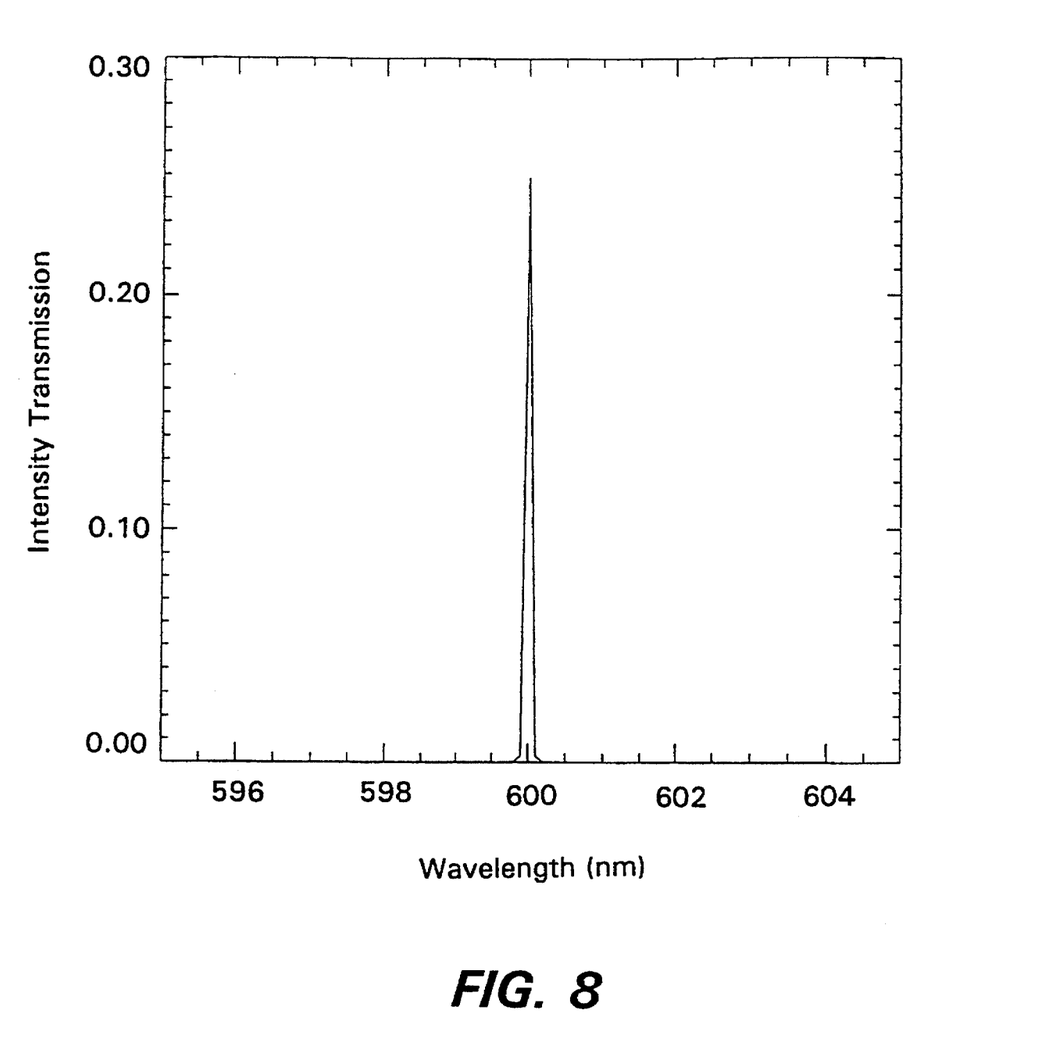
FIG. 8 is a calculated transmission spectrum for a Fabry-Perot Šolc filter with optical path length $2\phi=85\lambda$ at $\lambda=600$ nm and variable retarder order 10.

Similarly, the Fabry-Perot order determines the FSR of the Fabry-Perot fringes. FIG. 7 show the transmission function of the device of FIG. 1 with a tenth order variable retarder and an optical path length of $2\phi=85\lambda$ (FIG. 7A) and $170\lambda$ (FIG. 7B). Note that the Fabry-Perot FSR 115 increases as the optical path length decreases. This provides an improved out-of-band rejection for the filter, but at the cost of increased Fabry-Perot fringe linewidth and therefore reduced finesse. Thus, depending on design specifications, the cavity length is chosen in view of the trade-off between higher finesse and better out of band rejection, as demonstrated in the examples below. Also in FIG. 7 the two sets of fringes from the ordinary 112 and extraordinary 111 axes of the birefringent elements are indicated. FIG. 7 illustrates that the optical path length can be chosen such that the two sets of fringes have the same wavelength at the filter transmission maximum. The performance of the filter FIG. 7A is illustrated by plotting the transmission intensity on a linear scale in FIG. 8.

The scope of this invention is not limited to the specific configurations illustrated herein. The various design structures described herein, i.e. the liquid crystal variable retarder, the liquid crystal isotropic spacer, tailoring of the Šolc and Fabry-Perot free spectral ranges to specific resolution and tuning requirements, the reflection mode devices, and the like can be used separately or in combination to construct a filter of this invention. Variations in the orientations and the ordering of the filter elements can be readily adapted by those skilled in the art to produce functioning multipass polarization-interference filters. Analysis with Jones calculus can be performed by those skilled in the art to derive the transfer function for design candidates of $\Theta$, $\rho$, and N. The quarter-wave plate 25 and the polarizer 55 can be constructed to be electro-optically or mechanically rotatable so that different configurations can be obtained in a single device.

The significant advantages of this invention are illustrated with the following exemplary applications. In each case, the resolution, tuning range, and liquid crystal material are tailored to the specific application.

Intracavity laser line filters require high resolution but a limited tuning range is typically sufficient. For high resolution, a large Fabry-Perot order is preferably chosen via the isotropic spacer and, to compensate for the resulting decreased out of band rejection, the order of the central retarder is preferably large so that the Šolc envelope is narrowed. In this case a tunable isotropic spacer such as a quarter-half-quarter CSLC variable retarder can be employed to provide tuning of the Fabry-Perot fringes. The Šolc central retarder can be a fixed half-wave plate or, since in this application a large cavity length is acceptable, it can be a non-liquid crystal variable retarder such as $LiNbO_3$.

For an optical communications demultiplexer, rapid tuning over the range of laser signals is required, but the resolution need only be sufficient to separate adjacent laser wavelengths. To achieve this, the Šolc envelope rather than the Fabry-Perot fringes is tuned, preferably by a CSLC quarter-half-quarter variable retarder. A low variable retarder order is preferably chosen so that the tunable FSR of the Šolc envelope is greater than the range of laser frequencies. Similarly the cavity order is preferably small to increase the FSR of the Fabry-Perot fringes and thus provide a high out-of-band rejection. In such a communications system, the wavelengths of the lasers are preferably chosen to correspond to Fabry-Perot fringes in the filter. The liquid crystal variable retarders are particularly advantageous in this application because they make possible large Šolc and Fabry-Perot FSR's and large tuning ranges of the Šolc envelope. The currently available analog CSLC's have a maximum tilt angle of 22.5° which provides a maximum retardation variation of $\pi$ and thus allows tuning over half of the FSR. Thus using such molecules the filter is designed so that the FSR of the Šolc envelope is twice the wavelength range of laser signals. CSLC materials with increased tilt angles are being developed, and larger retardations can be achieved with currently available materials by cascading analog CSLC cells.

The Fabry-Perot Šolc filter constitutes, in itself, a spectrometer. A high resolution, low tuning range spectrometer can be implemented with a tunable isotropic spacer, as in the laser line filter. A larger tuning range can be achieved with a variable retarder which tunes the Šolc envelope, as in the demultiplexer. In this case the effective resolution of the spectrometer is the spacing of the Fabry-Perot fringes, bearing in mind that there are two sets of fringes due to the ordinary and extraordinary axes. Synchronously tuning the variable retarder and the isotropic spacer creates a high resolution spectrometer with a tuning range limited only by the achromaticity of the quarter-wave plates.

In the above devices, the choice of discrete versus analog CSLC depends on the application. The laser line filter or the spectrometer preferably employ a discrete state CSLC if they are used in differential absorption or transmission type applications. These situations require rapid reproducible switching between two wavelengths, as provided by a bistable CSLC such as a SmC* ferroelectric liquid crystal. Similarly, discrete CSLC's are preferred in the demultiplexer if only 2 or 3 channels are required. To obtain multiple discrete states and for applications which require continuous tuning, an analog CSLC is preferably employed. Nematic liquid crystals, with tuning speeds of 100 msec, would be chosen for the variable retarder when simplicity of design is more important than tuning speed.

The reflection-mode configurations of this invention are advantageous in any application because of the reduction in the number of intracavity elements, which reduces complexity and cost of a device. They are of particular value in applications wherein reflection of the filtered light toward the direction of the incident light is desired. They also allow optical addressing of the filter wherein a photocell located outside of the filter cavity on the back of the approximately completely reflective back surface would provide a filter tuning signal.

All of the device configurations of this invention can be employed in multiple-pixel configurations.

The forgoing applications illustrate the versatility of the filter configurations of this invention and the advantages of this invention over the prior art. The forgoing descriptions of configuration and applications do not limit the scope of the present invention. Numerous other applications and configurations of the filters of this invention will be readily apparent to those skilled in the art.

We claim:

1. A tunable optical filter for receiving linearly polarized input light and for transmitting light of a selected design wavelength, comprising:

a front and a back reflector positioned to form a multipass cavity;

an exit polarizer positioned on the opposite side of said back reflector from said front reflector and oriented at angle $\theta$ with respect to the polarization of the input light;

a variable retarder positioned between said front and back reflectors and oriented at angle $\rho$ with respect to the polarization of the input light, said variable retarder being a half- or full-wave retarder at the design wavelength;

a first quarter-wave retarder positioned between said front reflector and said variable retarder and oriented parallel or perpendicular to the polarization of the input light; and a second quarter-wave retarder positioned between said back reflector and said variable retarder and oriented parallel or perpendicular to the polarization of the input light;

wherein said variable retarder is a multiple-element retarder comprising a planar-aligned chiral smectic liquid crystal half-wave retarder, the optic axis of which is rotatable by application of an electric field parallel to the smectic layers, said variable retarder further comprising third and fourth quarter-wave retarders positioned in series with and on first and second sides, respectively, of said liquid crystal half-wave retarder, wherein said third and fourth quarter-wave retarders are oriented parallel or perpendicular to each other and at an angle of $\rho \pm 45°$ with respect to the polarization of the input light.

2. The filter of claim 1 wherein said variable retarder is a multiple-element retarder comprising a means for determining the free spectral range of the polarization-interference envelope of said filter.

3. The filter of claim 2 wherein said means for determining the free spectral range comprises a fixed retarder oriented at said angle $\rho$ with respect to the polarization of the input light.

4. The filter of claim 1 wherein said variable retarder is a half-wave retarder at the design wavelength and said exit polarizer is oriented at $\theta = 90°$.

5. The filter of claim 4 wherein said multiple-element variable retarder further comprises a fixed retarder oriented at said angle $\rho$ with respect to the polarization of the input light.

6. The filter of claim 1 wherein said variable retarder is a full-wave retarder at the design wavelength and said exit polarizer is oriented at $\theta = 90° + 2\rho$.

7. The filter of claim 1 wherein said first and second quarter-wave retarders are achromatic over the bandwidth of the input light.

8. The filter of claim 1 wherein said variable retarder is a half-wave retarder at the design wavelength, said exit polarizer is oriented at $\theta = 90°$, and said first and second quarter-wave retarders are oriented parallel to each other.

9. The filter of claim 1 further comprising an entrance polarizer to polarize the input light.

10. The filter of claim 1 wherein said chiral smectic liquid crystal retarder comprises a discrete state cell which can be switched between discrete stable alignments of the optic axis by application of said electric field, 11. The filter of claim 1 wherein said chiral smectic liquid crystal retarder comprises an analog cell in which the optic axis of said cell is rotatable in an analog manner by application of said electric field.

12. The filter of claim 1 wherein said multipass cavity is a Fabry-Perot etalon and wherein said cavity further comprises an isotropic spacer position,ed between said front and back reflectors.

13. The filter of claim 12 wherein said isotropic spacer is a passive isotropic spacer.

14. The filter of claim 12 wherein said isotropic spacer is an actively varied isotropic spacer.

15. The filter of claim 14 wherein said isotropic spacer comprises a planar-aligned chiral smectic liquid crystal half-wave retarder, the optic axis of which is rotatable by application of an electric field parallel to the smectic layers, said isotropic spacer further comprising two quarter-wave retarders positioned in series with and on either side of said half-wave retarder, wherein said quarter-wave retarders are oriented parallel or perpendicular to each other and at an angle of $\pm 45°$ with respect to the polarization of the input light.

16. The filter of claim 1 wherein said front and back reflectors have R<1 and wherein said multipass cavity is a Fabry-Perot etalon in transmission-reflection mode.

17. The filter of claim 1 wherein said front reflector has $R \leq 1$ and said back reflector has $R \approx 1$.

18. The filter of claim 17 wherein said front reflector has $R<1$ and the cavity geometry is such that it forms a Fabry-Perot etalon in transmission-reflection mode wherein light enters said cavity through said front reflector, is completely reflected by said back reflector, and exits said cavity through said front reflector spatially separated from the input light.

19. The filter of claim 17 wherein said front reflector has $R<1$ and the cavity geometry is such that it forms a Fabry-Perot etalon in reflection mode wherein light enters said cavity through said front reflector, is reflected by said back reflector, and exits the cavity through said front reflector coincident with the input light.

20. The filter of claim 17 wherein said front and back reflectors have $R \approx 1$ and the cavity geometry is such that the light enters said cavity around one of said reflectors, has a discrete number of noncoincidental passes through said cavity, and exits said cavity around one of said reflectors.

21. The filter of claim 17 wherein said variable retarder utilizes a forward and return transit of light, with reflection from said back reflector, to provide said half or full wave of retardation and wherein said first and second quarter-wave retarders are provided by a forward and return transit, respectively, through a first single quarter-wave retarder positioned between said front reflector and said variable retarder.

22. The filter of claim 21 wherein said variable retarder provides, upon said forward and return transit, a half wave of retardation at the design wavelength, and said exit polarizer is oriented at $\theta=90°$.

23. The filter of claim 22 wherein said variable retarder is a multiple-element retarder comprising a planar-aligned chiral smectic liquid crystal quarter-wave retarder, the optic axis of which is rotatable by application of an electric field parallel to the smectic layers, and further comprising a second single quarter-wave retarder, positioned between said liquid crystal quarter-wave retarder and said first single quarter-wave retarder, and oriented at an angle of $\rho \pm 45°$ with respect to the polarization of the input light.

* * * * *